US009195813B2

(12) United States Patent
Hrybyk et al.

(10) Patent No.: US 9,195,813 B2
(45) Date of Patent: Nov. 24, 2015

(54) SECURE GESTURE

(71) Applicant: LOCKHEED MARTIN CORPORATION, Bethesda, MD (US)

(72) Inventors: Alex Hrybyk, Linthicum, MD (US); John S. Morrison, Crownsville, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 90 days.

(21) Appl. No.: 14/043,201

(22) Filed: Oct. 1, 2013

(65) Prior Publication Data

US 2014/0101752 A1 Apr. 10, 2014

Related U.S. Application Data

(60) Provisional application No. 61/711,535, filed on Oct. 9, 2012, provisional application No. 61/740,186, filed on Dec. 20, 2012.

(51) Int. Cl.

| | |
|---|---|
| *G06F 7/04* | (2006.01) |
| *H04L 9/32* | (2006.01) |
| *G06F 21/00* | (2013.01) |
| *G06K 9/00* | (2006.01) |
| *G06F 21/31* | (2013.01) |
| *G07C 9/00* | (2006.01) |

(Continued)

(52) U.S. Cl.
CPC ............... *G06F 21/31* (2013.01); *G06F 21/32* (2013.01); *G06F 21/6218* (2013.01); *G06K 9/00885* (2013.01); *G07C 9/00158* (2013.01); *H04L 63/08* (2013.01); *H04L 63/083* (2013.01)

(58) Field of Classification Search
CPC ....... H04L 63/08; H04L 63/083; G06F 21/31; G06F 21/32; G06F 21/6218; G06K 9/00885; G07C 9/00158
USPC ............ 726/17; 713/168, 182, 186; 340/5.82; 382/115
See application file for complete search history.

(56) References Cited

U.S. PATENT DOCUMENTS

| | | |
|---|---|---|
| 5,802,590 A | 9/1998 | Draves |
| 7,272,654 B1 * | 9/2007 | Brendel .................. 709/229 |

(Continued)

FOREIGN PATENT DOCUMENTS

WO WO 2012/104312 A1 8/2012

OTHER PUBLICATIONS

A. De Luca, R. Weiss, and H. Hussmann. PassShape: Stroke Based Shape Passwords. In Proceedings of the 2007 Conference of the Computer-human Interaction Special Interest Group (CHISIG) of Austrialia on Computer-human interaction: design: activities, artifacts and environments. Australia 2007, pp. 239-240.

(Continued)

*Primary Examiner* — Aravind Moorthy
(74) *Attorney, Agent, or Firm* — Oblon, McClelland, Maier & Neustadt, L.L.P.

(57) ABSTRACT

Aspects of the disclosure provide a system that includes a protected module, an input module and a gesture engine. The protected module is configured to be accessible based on a specific gesture of a user predetermined to have a right to access the protected module. The input module is configured to receive an input gesture from a requester to access the protected module. The gesture engine is configured to be trained to process the input gesture in order to grant/deny an access to the protected module by the requester.

25 Claims, 7 Drawing Sheets

(51) Int. Cl.
  *G06F 21/62* (2013.01)
  *G06F 21/32* (2013.01)
  *H04L 29/06* (2006.01)

(56) References Cited

U.S. PATENT DOCUMENTS

| | | | |
|---|---|---|---|
| 2003/0208289 A1* | 11/2003 | Ben-Arie | 700/61 |
| 2008/0091605 A1 | 4/2008 | Hughes et al. | |
| 2009/0006292 A1* | 1/2009 | Block | 706/20 |
| 2009/0051648 A1* | 2/2009 | Shamaie | G06F 3/0346 345/156 |
| 2010/0052851 A1* | 3/2010 | Kaehler | 340/5.81 |
| 2011/0156867 A1* | 6/2011 | Carrizo | G06K 9/00167 340/5.85 |
| 2011/0251954 A1 | 10/2011 | Chin | |
| 2012/0164978 A1 | 6/2012 | Conti et al. | |
| 2013/0159732 A1* | 6/2013 | Leoutsarakos | 713/193 |
| 2014/0028539 A1* | 1/2014 | Newham | G06F 1/1694 345/156 |
| 2014/0101752 A1* | 4/2014 | Hrybyk | G06F 21/31 726/17 |

OTHER PUBLICATIONS

A.L. Meitiv, Are Android Unlock Patterns as Secure as Numeric Pins? What Can Scientific Models Tell Us About the World (blog). Apr. 14, 2010. Available at: http:/playingwithmodels.wordpress.com/2010/04/14/android_unlock_patterns/.
D. Kravets. FBI Can't Crack Android Pattern-Screen Lock. Wired. Mar. 14, 2012. Available at: http://www.wired.com/threatlevel/2012/03/fbi-android-phone-lock/.
I. Jermyn, A. Mayer, F. Monrose, M. Reiter and A. Rubin. The Design and Analysis of Graphical Passwords. In Proceedings of the 8th USENIX Security Symposium, Aug. 1999.
J. Thorpe, P. van Oorschot. Graphical Dictionaries and the Memorable Space of Graphical Passwords. In Proceeding of the 13th USENIX Security Symposium, 2004, pp. 135-140.
H. Tao. Pass-Go, A New Graphical Password Scheme. Master's Thesis, University of Ottawa, 2006.
D. Klein. Foiling the Cracker: A Survey of, and Improvements to, Password Security. In Proceedings of the 2nd USENIX Security Workshop, Aug. 1990.
M. Van Kleek, C. Varenhort, L. Rudolph, Lightweight Identification for Enabling Personalization on Public Displays. MIT CSAIL. Available at http://people.csail.mit.edu/emax/papers/lightweight-identification.pdf.
C. Varenhorst. Passdoodles: A Lightweight Authentication Method. Available at: http://people.csail.mit.edu/emax/public_html/papers/varenhorst.pdf.
J. Goldberg, J. Hagman, and V. Sazawal. Doodling Our Way to Better Authentication. Available at: ftp://163.25.117.117/gyliao/TODylan/Doodling%20our%20way%20to%20better%20authentication.pdf.
M. Oka, K. Kato, X. Yingqing, L. Lin, and W. Fang. Scribble-a-Secret: Similarity-based Password Authentication Using Sketches. In 19th International Conference on Pattern Recognition, 2008.
Jain, A.K., Greiss, F.D., and Connell, S.D. On-line Signature Verification. In Pattern Recognition, 2002, 35, (12), pp. 2963-2972.
H. Hussman, A. De Luca, R. Weiss. Passshapes: Stroke Based Shape Passwords. Proceedings of the 19th Australasian conference on Computer-Human Interaction, pp. 239-240, 2008.
C. Calhoun, T.F. Stahovich, T. Kurtoglu, and L.B. Kara. Recognizing multi-stroke symbols. In AAAI Spring Symposium on Sketch Understanding, pp. 15-23, 2002.
Heloise Hse and A. Richard Newton. Sketched Symbol Recognition Using Zernike Moments. In International Conference on Pattern Recognition, pp. 367-370, 2004.
H. Kauppinen, T. Seppanen, and M. Pietikinen. An Experimental Comparison of Autoregressive and Fourier-based Descriptors in 2-D Shape Classification. Pattern Analysis and Machine Intelligence, IEEE Transactions on, 17(2):201 {207, Feb. 1995.
Eamonn J. Keogh and Michael J. Pazzani. Derivative Dynamic Time Warping. In First SIAM International Conference on Data Mining (SDM2001), 2001.
Jiayang Liu, Zhen Wang, Lin Zhong, J. Wickramasuriya, and V. Vasudevan. uWave: Accelerometer-based Personalized Gesture Recognition and Its Applications. In Pervasive Computing and Communications, 2009. PerCom 2009. IEEE International Conference on pp. 1-9, Mar. 2009.
Zhengwei Yang and F.S. Cohen. Image Registration and Object Recognition Using Affine Invariants and Convex Hulls. Image Processing, IEEE Transactions on 8(7):934 {934, Jul. 1999.
D. Zhang and G. Lu. Review of Shape Representation and Description Techniques. In Pattent Recognition, vol. 37, pp. 1-19, 2004.
International Search Report and Written Opinion issued Apr. 28, 2014 in PCT/US13/62872.

\* cited by examiner

SECURE GESTURE

INCORPORATION BY REFERENCE

This present disclosure claims the benefit of U.S. Provisional Application No. 61/711,535, "DRAWN SYMBOL/GESTURE RECOGNITION FOR USER AUTHENTICATION" filed on Oct. 9, 2012, and U.S. Provisional Application No. 61/740,186, "TEMPO FUGIT-GESTURE SPEED PROFILE AUTHENTICATION" filed on Dec. 20, 2012, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, electronic devices, such as smartphones, tablet computers, sale terminals, and the like can be used to access critical information, such as access enterprise and personal information, initiate and authenticate monetary transactions, assist in medical and health services, support sensitive and classified government operations, and the like. The critical information carried by these devices needs to be protected against unauthorized access.

SUMMARY

Aspects of the disclosure provide methods and systems to allow a user to choose a motion-based pattern or symbol of his (her) own after a training step. The pattern is referred to as the user's "gesture" or "gesture". The pattern can be a pattern in a 2-D space or 3-D space. The algorithm is also flexible enough to allow minor changes between inputs.

Aspects of the disclosure provide a system that includes a protected module, an input module and a gesture engine. The protected module is configured to be accessible based on a specific gesture of a user predetermined to have a right to access the protected module. The input module is configured to receive an input gesture from a requester to access the protected module. The gesture engine is configured to be trained to process the input gesture in order to grant/deny an access to the protected module by the requester.

Aspects of the disclosure provide a method. The method includes providing a module with an access control that grants an access based on a specific gesture of a user predetermined to have a right to access the module, receiving an input gesture from a requester and processing the input gesture by a gesture engine in order to grant/deny an access to the module by the requester.

Aspects of the disclosure provide an apparatus that includes an input module and a controller. The input module is configured to receive an input gesture from a requester. The controller is configured to determine an error of the input gesture to a reference gesture, compare the error to an error profile associated with the reference gesture, and grant/deny the requester to use the apparatus based on the comparison.

Aspects of the disclosure provide an apparatus that includes an input module and a controller. The input module is configured to receive an input gesture from a requester. The controller is configured to determine a hash value for any given gesture, taking into account an acceptable level of error ("tolerance"). If the hash key matches a comparison key, or if the hash key can be used to successfully decrypt a file, then the requester is granted use of the apparatus.

Aspects of the disclosure provide a system. The system includes a plurality of encrypted data structures. Each encrypted data structure is configured to be decryptable based on a specific gesture of a user who owns the encrypted data structure. Further, the system includes an input module configured to receive an input gesture from a requester and a gesture engine configured to generate a key in response to the input gesture, search for an encrypted data structure based on the key, and decrypt the encrypted data structure based on the key.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
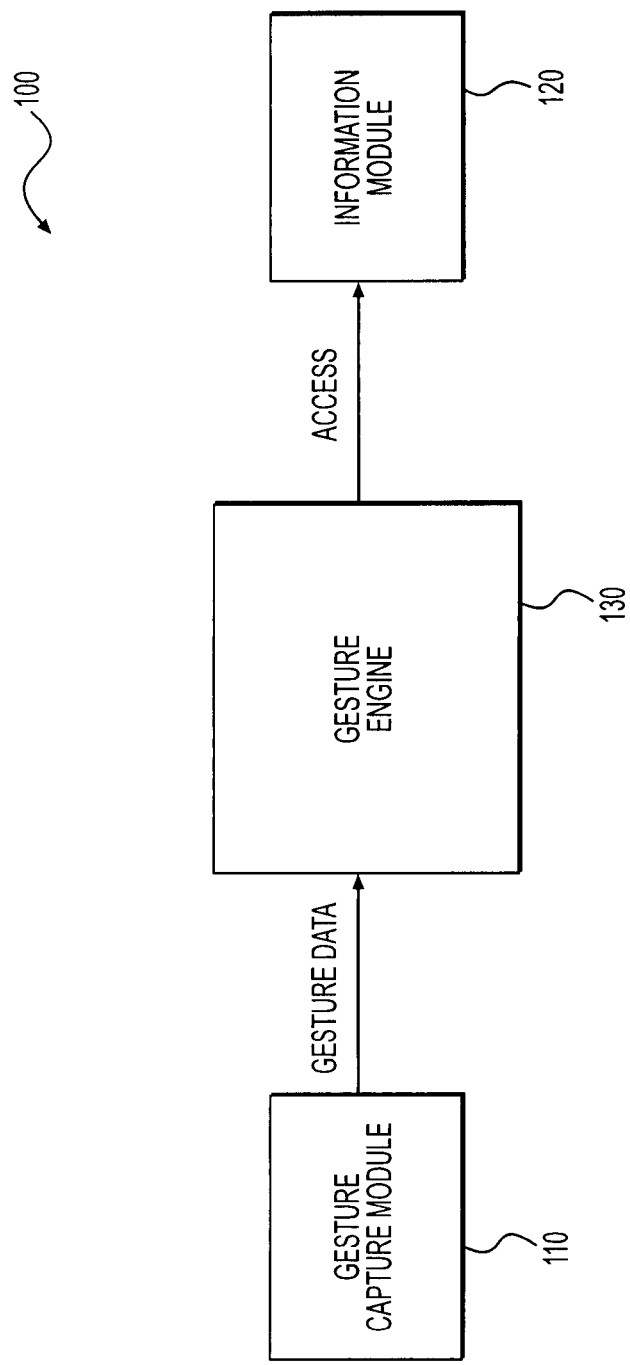
FIG. 1 shows a block diagram of an exemplary system 100 based on gesture according to an embodiment of the disclosure.

FIG. 1 shows a block diagram of an exemplary system 100 according to an embodiment of the disclosure. The system 100 is configured to grant/deny a user to access critical information based on a gesture owned by the user. The system 100 includes a gesture capture module 110, a gesture engine 130 and an information module 120. These elements are coupled together as shown in FIG. 1.

The gesture capture module 110 is configured to capture a gesture, and generate a data set in response to the captured gesture. According to an aspect of the disclosure, a gesture is a move pattern that is specific of a user. The pattern can correspond to any existing symbols, such as Latin alphabet letters, numbers, and the like, or can correspond to arbitrary symbols. The gesture can be any suitable move pattern, such as a finger move pattern, an arm move pattern, a body move pattern, a cursor move pattern, a stylus pen move pattern, and the like.

Further, a gesture of a user can be unique based on individual preferences, mechanical motion of digit and coordinated muscle movement. The gesture of the user can represent something the user knows (e.g., a pattern) and something the user is (e.g., the personal method for generating the pattern using a time-based sequence of motions), and can be used as a biometric measure of the user in various security applications, such as authorization, identification, and the like. In an example, for the same alphabet letters, different users write in different ways. Further, even when a user tries to forge another user's symbol, characteristics of the move pattern, such as speed, acceleration, mechanical motion, muscle coordination, and the like, are hard to forge.

According to the disclosure, the gesture capture module 110 can include any device for capturing suitable characteristics of the gesture that is specific of the user. In an example, the gesture capture module 110 includes a touchscreen configured to capture characteristics of a move pattern in a two-dimension plane. In another example, the gesture capture module 110 includes one or more cameras configured to capture characteristics of a gesture in a three-dimension space. In another example, the gesture capture module 110 includes an electromagnetic field and sensors to capture electromagnetic parameters in the field. When a gesture is performed in the field, the captured electromagnetic parameters can be used to indicate characteristics of the gesture in a three-dimension space. In another example, the gesture capture module 110 includes one or more muscle sensors configured to capture characteristics of limbs/extremities activities corresponding to a gesture.

During operation, in an example, the gesture capture module 110 samples a move pattern based on a sampling clock, generates a vector for each sampling, and generates a data set including a time-series of vectors corresponding to the move pattern. In an embodiment, the gesture capture module 110 first validates a gesture input based on a time duration of the gesture input. When the time duration of the gesture input is larger than a threshold, the gesture input is considered invalid due to a potential forging scenario. Further, the sampling clock is suitable set to obtain 150 to 400 sampling points for a move pattern. At each sampling point, a vector is generated to include various parameters captured to characterize a profile at the sampling point.

In an example, a vector includes a time stamp, a first value in X-axis, a second value in Y-axis. The time stamp characterizes the time when the sampling takes place, and the first value and the second value characterize a position in a two-dimension plane. In another example, the vector additionally includes a third value in Z-axis. The first value, the second value and the third value characterize a position in a three-dimension space. In another example, the vector includes a value of speed at the sampling time. In another example, the vector includes a value of acceleration at the sampling time. In an example, the speed and acceleration can be calculated based on the neighboring samplings. In another example, the vector includes values captured from muscle sensors that characterize muscle profile at the sampling time.

It is noted that, in an embodiment, a gesture is performed by multiple fingers for example, and thus a vector can include values corresponding to positions of the multiple fingers.

The gesture engine 130 receives a data set in response to a captured gesture, processes the data set, and makes a decision, such as granting or denying access to the information module 120, in response to captured gesture.

According to an aspect of the disclosure, in one embodiment, the gesture engine 130 stores a reference gesture and an error profile for a user. The reference gesture and the error profile are determined during a training stage, and are used during an evaluation stage to determine whether a future input of a gesture is correct and belongs to a given user or not.

In an example, during the training stage, the user performs his or her gesture multiple times, such as ten times, the gesture engine 130 receives the gesture inputs, computes a mean gesture as the reference gesture, and computes the error profile based on the multiple gesture inputs. Then, during the evaluation stage in an example, the gesture engine 130 receives a gesture input, compares the received gesture input with the reference gesture to determine an error. When the error satisfies the error profile, such as within an error range, the gesture engine 130 grants the access to the information module 120; and when the error fails to satisfy the error profile, the gesture engine 130 denies the access to the information module 120.

According to another aspect of the disclosure, in another embodiment, the gesture engine 130 does not store the reference gesture, and is configured to generate a key in response to the gesture input. The key is used for granting/denying accessing to the information module 120.

In an embodiment, the gesture engine 130 is trained to generate different keys in response to gestures from different users and generate the same key in response to the gesture from the same user. Generally, a user may repeat a gesture with variations in consistency, such as size variation, translation variation, and the like. The gesture engine 130 receives the data set that varies due to the variations in consistency. The gesture engine 130 is configured to use various techniques, such as normalization, error correction, and the like to process the data set and generate an invariant key in response to the data set that varies due to the variations in consistency.

In an embodiment, the gesture engine 130 is pre-trained in response to gestures from users that have been granted access to the information module 120. In an example, during a training stage, the gesture engine 130 is trained to generate a key in response to a gesture from a user. The user performs his or her gesture multiple times, such as ten times, the gesture engine 130 receives the gesture inputs, computes a bound on error that allows the gesture engine 130 to determine whether a future input is correct and belongs to a given user or not. The gesture engine 130 can be trained in response to various individuals. The individuals can choose an arbitrary symbol of their choosing, or their signatures. In an example, the gesture engine 130 can be configured to guide a user to choose suitable gesture that can improve security performance, such as reducing false positive rate and the like.

According to an aspect of the disclosure, during the training stage, the gesture engine 130 adjusts parameters in the engine to generate the key in response to the gesture inputs, but does not save the gesture inputs. Thus, the gesture is not obtainable via reverse-engineering when the gesture engine 130 is hacked for example.

The information module 120 can be any suitable module, such as resources of a device, encrypted information stored in a database, and the like.

According to an embodiment of the disclosure, the electronic system 100 can be a system integrated in a single device, such as a smart phone, a tablet, a laptop, and the like, or can be a distributed system that includes multiple devices at different locations and the multiple devices can communicate via suitable communication channels.

Further, the gesture engine 130 can be implemented by various techniques. In an example, the gesture engine 130 is implemented as pure circuits. In another example, the gesture engine is implemented as instruction codes (software application) executed by a processor.

Figure 2:
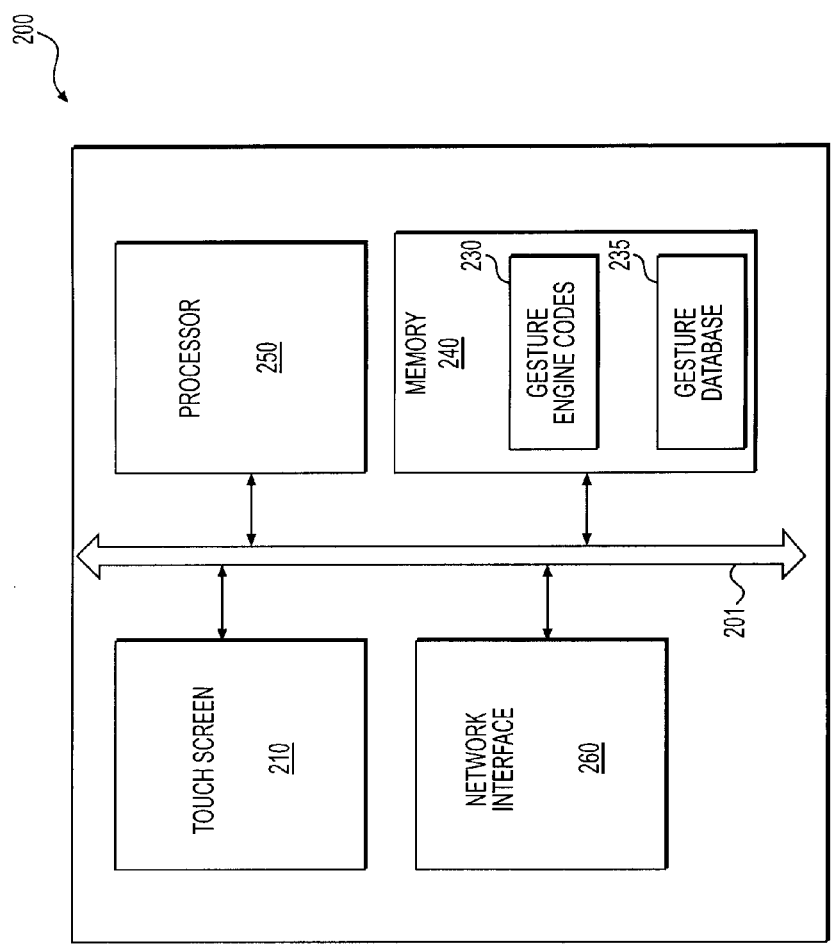
FIG. 2 shows a block diagram of an exemplary electronic system 200 according to an embodiment of the disclosure.

FIG. 2 shows a block diagram of an exemplary electronic system 200 according to an embodiment of the disclosure. The electronic system 200 is a detail example of the system 100. The electronic system 200 includes a touchscreen 210, a processor 250, and a memory module 240. In the FIG. 2 example, these components are coupled to a bus 201 that can transfer data from one component to another component.

The electronic system 200 can be any suitable system, such as a smart phone, a tablet, a laptop, and the like.

The touchscreen 210 includes a display panel that is configured to sense touches on the display panel. In an example, the touchscreen 210 includes a matrix of sensors in a layer of the display panel to sense touches on the display panel. When a finger or a stylus pen moves on the surface of the display panel, the matrix of sensors generates a data set of time-series vectors in response to the finger move for example. Each vector includes a time stamp and a location on the 2-dimension display panel (e.g., a first value in X-axis of the matrix and a second value in Y-axis of the matrix). It is noted that, in an example, a vector can include multiple locations respectively for multiple fingers.

The processor 250 can execute system and application codes. The memory module 240 includes various suitable memories, such as static random access memory (SRAM), dynamic random access memory (DRAM), non-volatile memory, and the like. The memory module 240 can hold any suitable information, such as system and application codes, data, and the like. In an example, the processor 250 can execute codes in the memory module 240 to act as a controller.

In the FIG. 2 example, the memory module 240 includes a first memory space allocated to store gesture engine codes 230 and a second memory space allocated to store a gesture database 235. In an example, the processor 250 executes the gesture engine codes 230 to act on a gesture engine of the electronic system 200. The gesture engine can access the gesture database 235 to write gesture data in the gesture database 235 or read gesture data from the gesture database 235. In an example, the gesture database 235 stores reference gestures and corresponding error profiles learned during a training stage.

The electronic system 200 can include other suitable components, such as a network interface 230 configured to enable the electronic system 200 to communicate with other system (not shown) in a network.

It is noted that, in another embodiment, the gesture engine of the electronic system 200 can be implemented by other suitable technology, such as field-programmable gate array (FPGA), application-specific integrated circuit (ASIC), and the like.

According to an aspect of the disclosure, the gesture engine of the electronic system 200 can have a training mode and an evaluation mode. In the training mode, the gesture engine determines one or more reference gestures and corresponding error profiles, which is described in detail with reference to FIG. 3. In the evaluation mode, the gesture engine evaluates a gesture input, and grants/denies access in the electronic system 200 based on the evaluation, which is described in detail with reference to FIG. 4.

Figure 3:
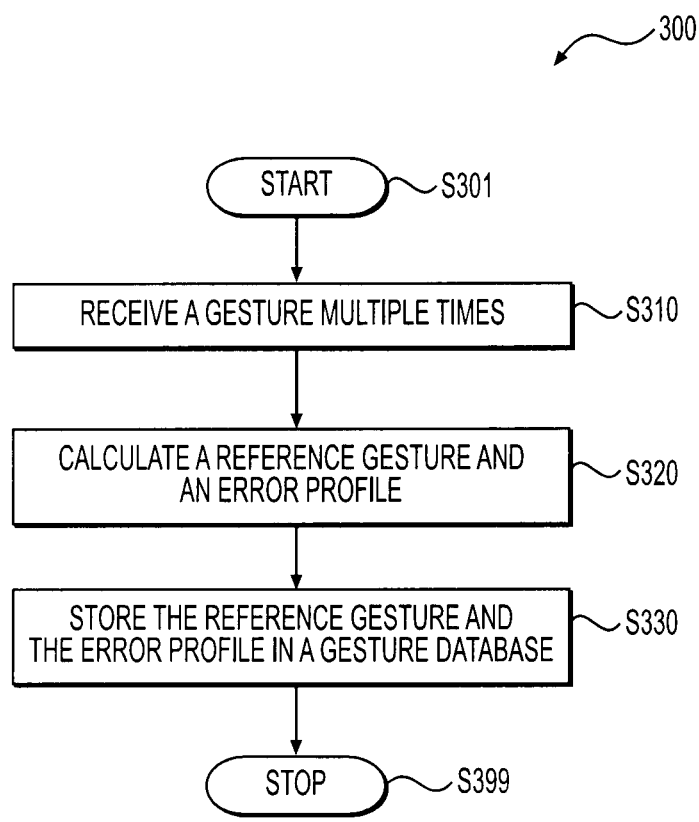
FIG. 3 shows a flow chart outlining an exemplary process 300 according to an embodiment of the disclosure.

FIG. 3 shows a flow chart outlining an exemplary process 300 according to an embodiment of the disclosure. In an embodiment, the process 300 is executed in the electronic system 200 at a training stage when the gesture engine operates in a training mode. The process starts at S301 and proceeds to S310.

At S310, a gesture is input multiple times into an electronic system, such as the electronic system 200. In an embodiment, the gesture engine in the electronic system 200 can include various features to guide a user to input a gesture multiple times. In an example, the gesture engine can guide the user to use finger or stylus to create a move pattern on the touchscreen 210 for multiple times. Each time, the touchscreen 210 provides a time-series of vectors corresponding to the move pattern to the gesture engine in the electronic system 200. In an example, the gesture engine can cause the touch screen not to display the move pattern to prevent "shoulder-surfing" type potential forgings. In another example, the gesture engine can cause the touchscreen 210 to display the move pattern to provide visual guidance to the user. It is noted that the move pattern can be displayed with certain visual features, such as fading, and the like, to prevent "shoulder-surfing" type potential forgings. In addition, in an example, the gesture engine can provide a security score to a gesture to indicate a security level of the gesture, and guide the user to use a gesture having a higher security level. In another example, the gesture engine can provide an error score to an input of the gesture to indicate a variation of consistency to previous inputs of the gesture.

At S320, a reference gesture and an error profile are calculated based on the multiple inputs of the gesture. In an example, the gesture engine of the electronic system 200 uses a dynamic time warping (DTW) algorithm to align the multiple inputs, and computes a mean gesture and a statistical error profile based on the aligned multiple inputs of the gesture.

At S330, the reference gesture and the error profile are stored in a gesture database. In an example, the gesture engine of the electronic system 200 stores the mean gesture as the reference gesture and the statistical error profile as the error profile into the gesture database 235. The process proceeds to S399 and terminates.

It is noted that the process 300 can be modified. In an example, multiple gestures may be combined to form a combined gesture for accessing the electronic system 200. For example, a user may selects a plurality of symbols from [A-F] and [0-9] to form a combined gesture. The gesture engine can guide the user to go through the process S310 to S330 for multiple times to learn the selected symbols.

Figure 4:
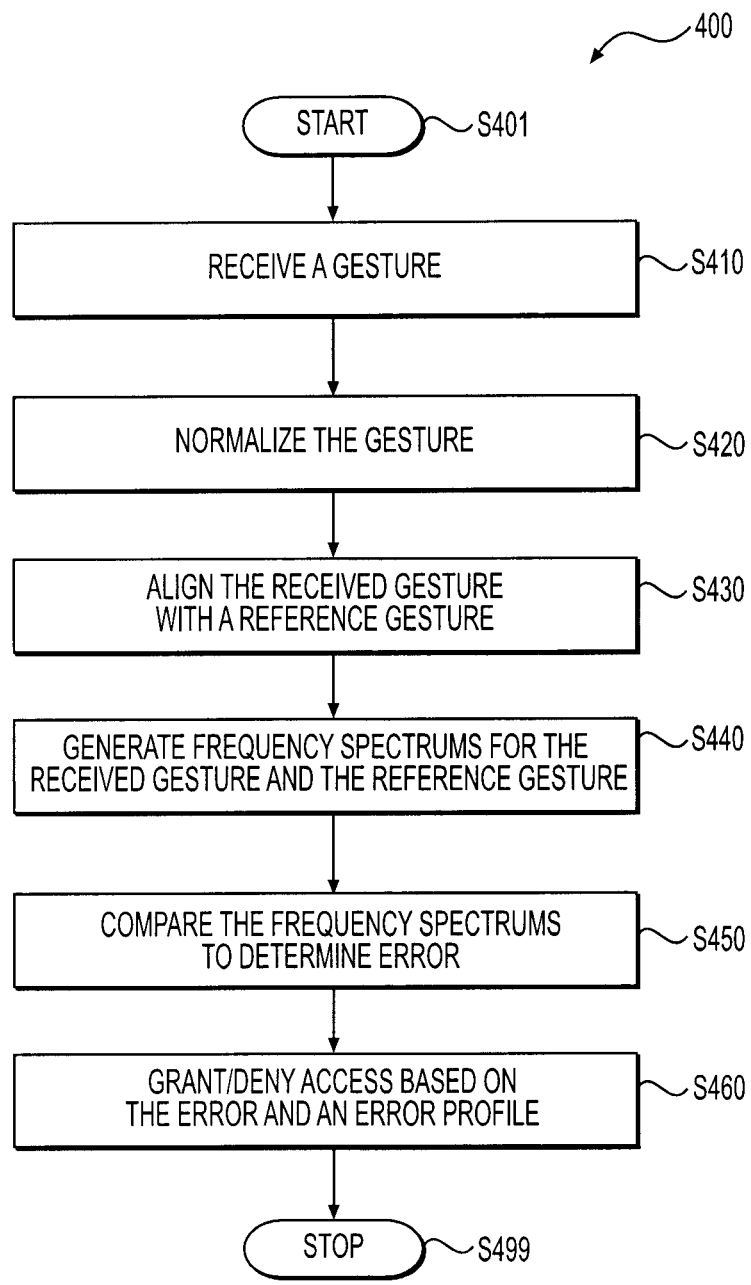
FIG. 4 shows a flow chart outlining an exemplary process 400 according to an embodiment of the disclosure.

FIG. 4 shows a flow chart outlining an exemplary process 400 according to an embodiment of the disclosure. In an embodiment, the process 400 is executed in the electronic system 200 at an evaluation stage when the gesture engine is in the evaluation mode. The process starts at S401, and proceeds to S410.

At S410, a gesture input is received. In an embodiment, the gesture engine of the electronic system 200 can include various features to allow a user to input a gesture. In an example, the gesture engine can instruct the user to use finger or stylus to input a gesture on the touchscreen 210. The touchscreen 210 provides vectors corresponding to the gesture input to the gesture engine in the electronic system 200. In an example, the gesture engine can cause the touchscreen 210 to display the gesture. Further, in an example, the gesture engine causes the touchscreen 210 to display the gesture with a visual feature, such as a fading feature, to enable secure gesture input to prevent "shoulder-surfing" type forging scenarios.

At S420, the gesture input is normalized. In an example, the user can input the gesture at any location of the touchscreen 210, and can input the gesture of any size. The gesture engine in the electronic system 200 can shift the position, and scale the size of the input of the gesture to normalize the gesture input.

At S430, the gesture input is aligned with a reference gesture. In an example, the gesture engine of the electronic system 200 uses dynamic time warping algorithm to align the normalized the gesture input with the reference gesture.

At S440, frequency spectrums are generated respectively for the normalized gesture input and the reference gesture. In an example, the gesture engine of the electronic system 200 uses a Fourier transform algorithm to calculate Fourier weights for different frequency components of the normalized gesture input and the reference gesture.

At S450, the frequency spectrums are compared to calculate an error. In an example, the gesture engine in the electronic system 200 compares the Fourier weights of corresponding frequency components for the normalized gesture input and the reference gesture, and calculates an error. For example, the error can be calculated according to Eq. 1:

$$\text{error} = \Sigma_{k=0}^{N-1}(Z[k]-T[k])^2 \qquad \text{Eq. 1}$$

where N denotes the number of frequency components, Z[k] denotes Fourier weight of the $k^{th}$ frequency component for the normalized the gesture input, and T[k] denotes Fourier weight of the $k^{th}$ frequency component for the reference gesture.

At S460, the access is granted or denied based on the error and the error profile associated with the reference gesture. In an example, when the error satisfies the error profile, the gesture input is considered as matching the reference gesture, and the access to the electronic system 200 is granted; and when the error does not satisfy the error profile, the gesture input is considered as not matching the reference gesture, and the access to the electronic system 200 is denied. Then the process proceeds to S499 and terminates.

It is noted that the process 400 can be suitably modified. In an example, multiple users have respective rights for access the electronic system 200. The gesture database 235 stores the reference gestures, error profiles and access rights for the users. The gesture engine can repeat S430 to S460 to compare the gesture input with respective reference gestures stored in the gesture database 235 until the gesture input matches one of the reference gestures, and the access is granted with the corresponding access right or until the gesture input does not match any of the reference gestures, and the access is denied.

Figure 5:
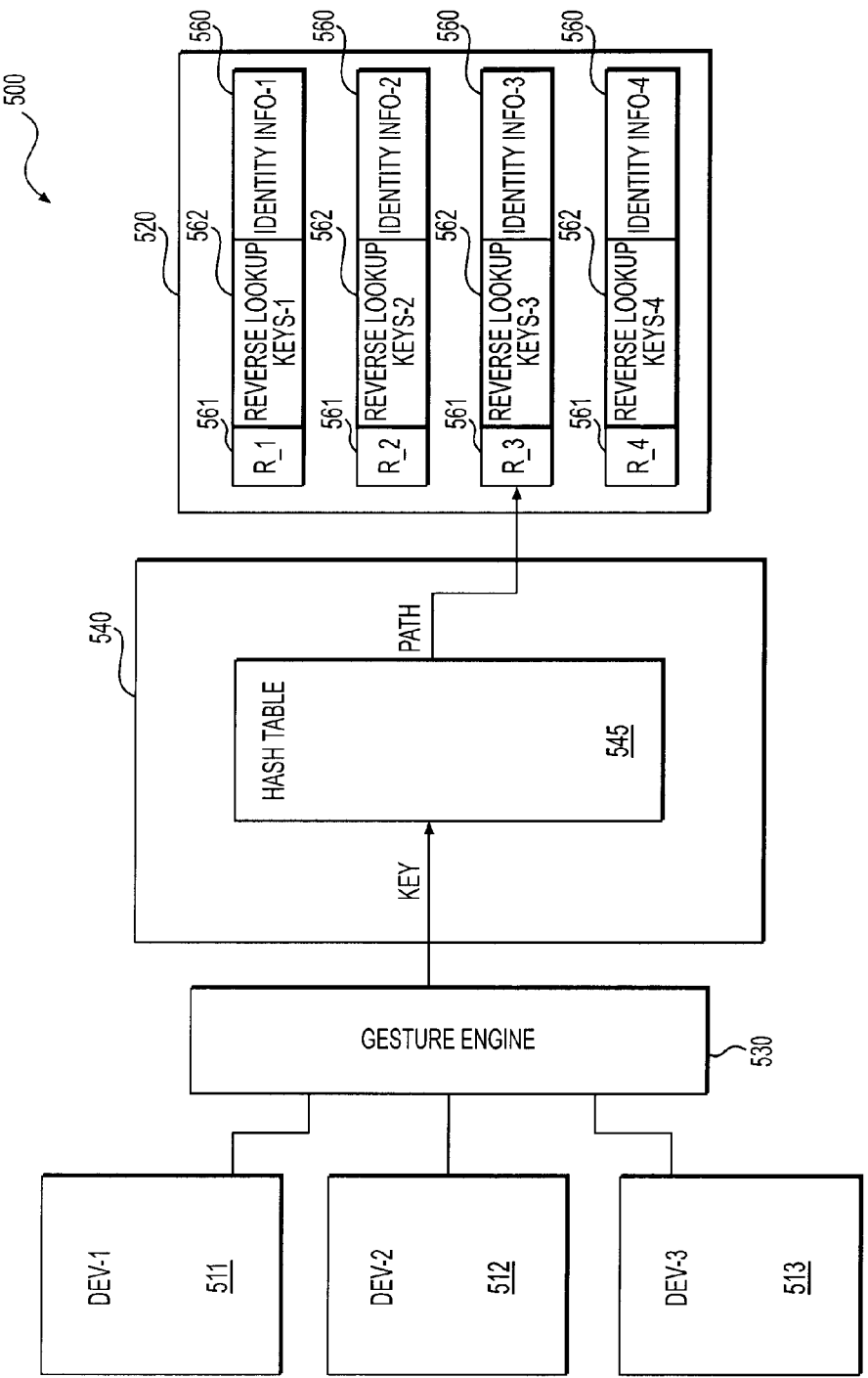
FIG. 5 shows a block diagram of an exemplary identity management system 500 according to an embodiment of the disclosure.

FIG. 5 shows a block diagram of an exemplary identity management system 500 according to an embodiment of the disclosure. The identity management system 500 is a detail example of the system 100. The identity management system 500 uses gestures to protect identity information. The identity management system 500 includes terminal devices 511-513, a gesture engine 530, a server 540, and an identity database 520. These elements are coupled together as shown in FIG. 5.

Each of the terminal devices 511-513 can be any suitable electronic device, such as a smart phone, a tablet, a laptop, a computer, a point-of-sale terminal computer, and the like. The terminal device 511-513 can be used in any suitable places. In an example, a terminal device is used at a point of sale. In another example, a terminal device is used at a transportation security administration (TSA) entry point. In another example, a terminal device is used at an airline ticket gate. In another example, a smart phone is plugged in an interface socket of a point-of-sale terminal computer and coupled with the terminal computer.

The terminal devices 511-513 are configured to collect gesture data. In an example, a terminal device includes a built-in gesture capture component, such as a touchscreen and the like, configured to capture a gesture. In another example, a gesture capture device (not shown) is coupled to a terminal device to provide captured gesture data to the terminal device. The terminal devices 511-513 can provide captured gesture data to the gesture engine 530.

The gesture engine 530 is configured to generate an invariant key in response to inputs of a gesture that is specific of a user. The inputs may have variations with consistency, and the gesture engine 530 is configured to tolerate a certain level of variations. Thus, when the variations of the inputs are within the tolerable level, the gesture engine 530 generates the invariant key in response to the gesture inputs. The key can include a series of characters, numbers and like, such as "Qqe21414z4$&m" in an example.

Further, for different users, the gesture engine 530 generates different keys respectively to gestures of different users. In an example, even for a same symbol, different users may use different move profiles, such as different orders of strokes, different directions of strokes, different speed profiles, and the like to generate the symbol. The gesture engine 530 generates different keys in response to the different move profiles.

It is noted that in an example, the gesture engine 530 can be embedded into each of the terminal devices 511-513. In another example, the gesture engine 530 is implemented in a dedicated device. In another example, the gesture engine 530 is implemented as a component of the server 540.

The server 540 receives the key generated in response to the gesture, and determines a path to an identity record of the user who performs the gesture. In the FIG. 5 example, the server 540 includes a hash table 545 configured to store a path (e.g., an index) at an address in the table. The path leads to an identity record in the identity database 520. The address can be determined according to the received key. Specifically, the key is hashed to determine the address in the hash table 545. The data stored at the address is then read. The data includes a path, such as an index and the like. Based on the path, an identity record can be retrieved.

It is noted that the identity management system 500 can include multiple servers 540.

The identity database 520 can be any suitable database, such as a central database, a cloud database, and the like. The identity database 520 stores identity records 560. According to an embodiment of the disclosure, an identity record 560 includes an index 561 and an encrypted capsule 562 holding the identity information. In an example, the index 561 is a number generated by a random number generator or a pseudo random number generator. Using random number can anonymize transactions. Further, in an example, the encrypted capsule 562 can only be decrypted by a key generated by the gesture engine 530 in response to the gesture of a user who owns the identity record. The encrypted capsule 562 can include any suitable information. In the FIG. 5 example, the encrypted capsule 562 include reverse lookup keys and identity information. The reverse lookup keys in the encrypted capsule provide a second check on the source of the path leading to the encrypted capsule, and, in some implementations, provide a way to erase data elements in the anonymized path leading to the identity capsule, beginning at the capsule and tracing backwards. The identity information of a user can include a photo, biometric data, name, social security number, passport number, date of birth, place of birth, citizenship, employer, spouse, mailing address, phone number, email address, personal device data, and the like of the user.

According to an aspect of the disclosure, the elements of the identity management system 500 are coupled together by any suitable communication channels, such as wired or wireless links, Ethernet, Internet, and the like.

According to an aspect of the disclosure, the identity management system 500 can perform an enrollment process to record a new identity record. An exemplary enrollment process will be described in detail with reference to FIG. 6. Further, the identity management system 500 can perform a retrieval process to retrieve an identity record. An exemplary retrieval process will be described in detail with reference to FIG. 7.

According to an aspect of the disclosure, the identity management system 500 can have reduced risk of security leakage at various entities in the system. Specifically, a gesture is a biometric character of its owner and is something the owner knows (e.g., a pattern) and something the owner is (e.g., the user's unique approach to applying the pattern). In an example, only the owner of the gesture can generate the correct invariant key, the risk of leakage by forging the gesture is reduced. In another example, because the path to the identity record is determined by the correct invariant key generated from the gesture of the owner, the risk of leakage by network attacking is reduced. In another example, because the identity record is stored at a path that is determined by the correct invariant key generated from the gesture of the owner, and can only be decrypted based on the correct invariant key generated from the gesture of the owner, the risk of leakage by attacking the database is reduced.

The identity management system 500 can operate in various scenarios. In a scenario, the identity management system 500 is used in secure entry or point of sale for identity verification. In an example, a terminal device is used at a commercial point of sale (POS), a health authority/hospital patient enrollment, a voter registration/validation, a gate of a controlled access event, and the like to verify the identities. In this scenario, multiple people can use the same device to authenticate identity. The terminal device can pull down identity information from a central database for example.

In another scenario, the identity management system 500 is used for authentication of remote access. In an example, a terminal device can be used to enroll in web or network services without physical appearance. In another example, a terminal device can be used for remote access billing information and paying bills. In this scenario, enrollment can be accomplished via remote network access rather than in a controlled facility and environment. Further, additional security features can be added to the enrollment process to increase confidence in identity assertions during further authentication.

In another scenario, the identity management system 500 is used for global identity validation and tracking. In an example, the identity management system 500 is used in tracking, resource allocation, and relocation of displaced individuals (e.g., refugees, disaster response). In another example, the identity management system 500 is used for emailing forwarding of proof-of-identity information to third parties to support visit, and access to facilities, data and controlled processes. In another example, the identity management system 500 is useful in healthcare events, such as changing doctors, visiting specialists, and the like. In this scenario, a user can conduct local enrollment of identity information, local gesture-based encryption of identity records and anonymization of key. The identity management system 500 enables ability to re-verify locally or transmit identity records to other global locations where the user can authenticate to obtain goods or services.

In another scenario, the identity management system 500 is used in multiple-lock events. In an example, the identity management system 500 is used in nuclear command and control. In another example, the identity management system 500 is used in high stakes transactions that require multiple approvers. In another example, the identity management system 500 is used in vendor maintenance of systems. In this scenario, multiple gestures are combined in a single cryptographic key to enable a transaction or access to a token for example.

In another scenario, the identity management system 500 is used in authentication for voice dial-in. In an example, a user dials in from a smart phone to change for example, telephone, internet, or cable services. In another example, a user dials in from a smart phone to get medical assistance, access to health records or account information. In another example, a user dials in from a smart phone for insurance policy servicing. In this scenario, the user dials the service desk, and then authenticates using a gesture to verity that the user is the owner of the account.

Figure 6:
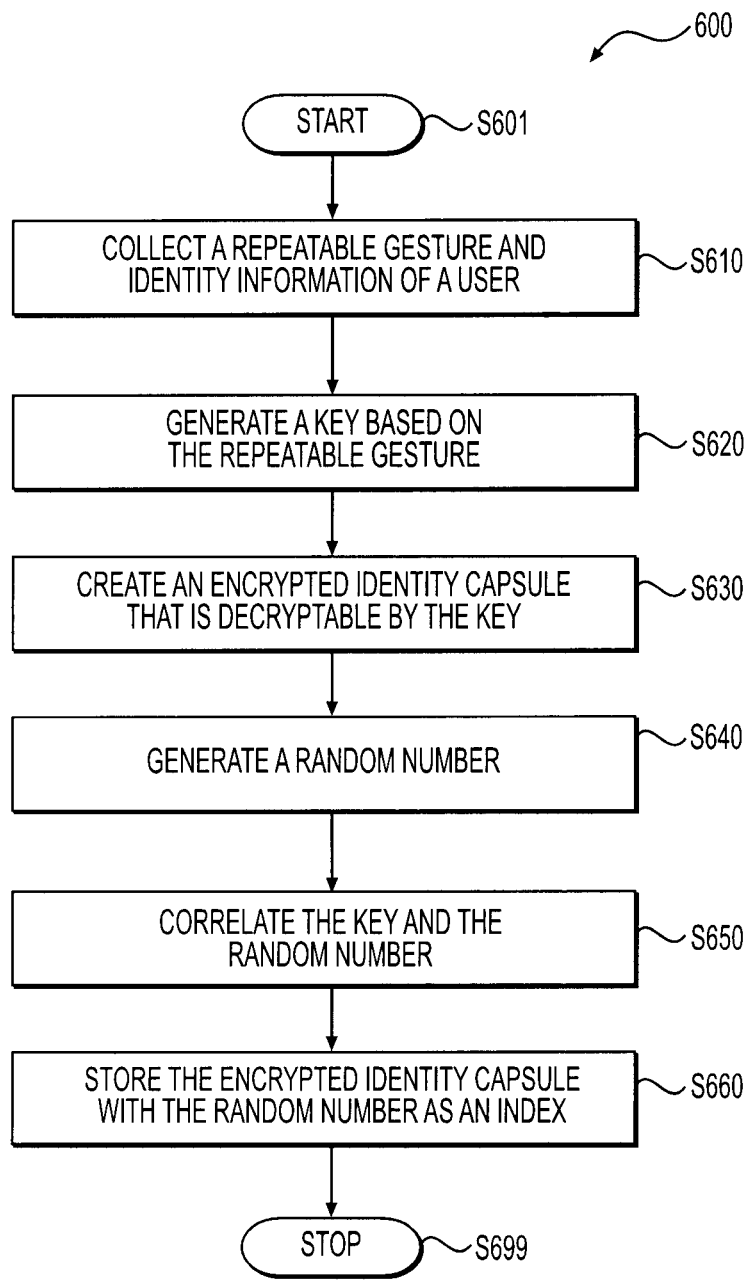
FIG. 6 shows a flow chart outlining an exemplary process 600 according to an embodiment of the disclosure.

FIG. 6 shows a flow chart outlining an exemplary process 600 according to an embodiment of the disclosure. In an example, the process 600 is executed in the identity management system 500 during an enrollment process. The process starts at S601, and proceeds to S610.

At S610, a repeatable gesture and identity information of a user is collected. In an example, a terminal device, such as the terminal device 513 is used for administration. During the enrollment process, the user performs a gesture specific of the user multiple times, and the terminal device 513 captures the multiple inputs of the gesture. The identity information can include any suitable information, such as a photo, biometric data, name, social security number, passport number, date of birth, place of birth, citizenship, employer, spouse, mailing address, phone number, email address, personal device data, and the like.

At S620, a key is generated based on the repeatable gesture. In an example, the gesture engine 530 is trained based on the multiple inputs of the gesture to generate an invariant key in response to the inputs of the gestures.

At S630, an encrypted identity capsule is created. The encrypted identity capsule is only decryptable by the invariant key. In an example, the key is a symmetric key for encryption and decryption. The identity information is included in an identity capsule, and then the identity capsule is encrypted by the invariant key.

At S640, a random number is generated. In an example, a random number generator or a pseudo random number generator is used to generate the random number.

At S650, the key and the random number are correlated. In an example, the key is hashed to determine an address in the hash table 545, and the random number is stored at the address in the hash table 545.

At S660, the encrypted identity capsule is stored in a database with the random number as the index. In an example, the encrypted identity capsule and the random number is stored as an identity record 560 in the database 520. Then, the process proceeds to S699 and terminates.

Figure 7:
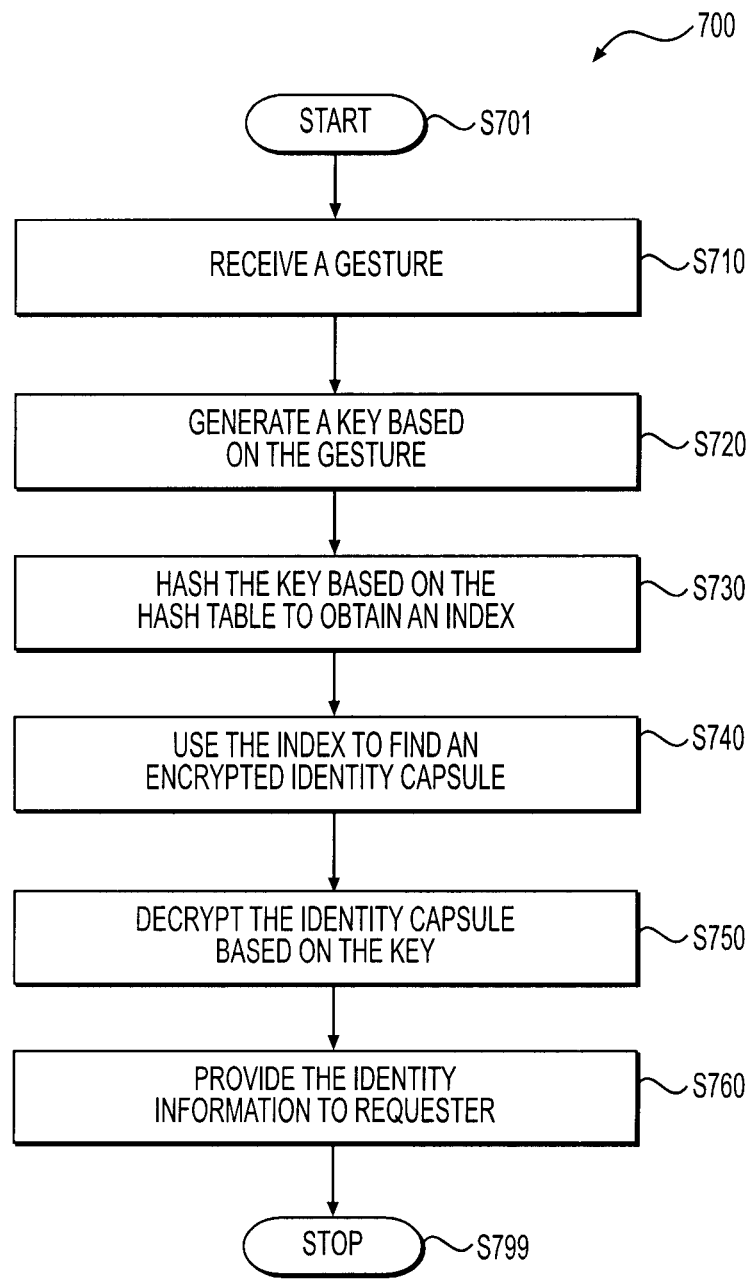
FIG. 7 shows a flow chart outlining an exemplary process 700 according to an embodiment of the disclosure.

FIG. 7 shows a flow chart outlining an exemplary process 700 according to an embodiment of the disclosure. In an example, the process 700 is executed in the identity management system 500 during a retrieval process. The process starts at S701, and proceeds to S710.

At S710, a gesture input is received. In an example, a requester, for example, at the point of sale, a security gate, a service center, and the like, requests identity information of a user. The user can perform a gesture on a terminal device, such as the terminal device 511 and the like. The terminal device gestures gesture data in response to the gesture input.

At S720, a key is generated based on the gesture input. In an example, the gesture engine 530 generates a key in response to the received gesture data.

At S730, the key is hashed to obtain an index. In an example, the key is hashed to determine an address in the hash table 545, and an index stored at the address is retrieved.

At S740, an encrypted identity capsule is retrieved based on the index. In an example, an identity record 560 having the index is retrieved from the identity database 520. The identity record 560 includes an encrypted identity capsule 562. In an example, the encrypted identity capsule is sent to the gesture engine 530, At S750, the identity capsule is decrypted based on the key. In an example, the encrypted identity capsule 562 is decrypted by the gesture engine 530 based on the key. When the user is the owner of the information in the encrypted identity capture 562, the encrypted identity capsule 562 is decryptable based on the key.

At S760, suitable identity information from the identity capsule is provided to the requester. In an example, a photo in the identity capsule is provided to the requester to verify the identity of the user. The process then proceeds to S799 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A system, comprising:
    circuitry implementing
        a protected module that is accessible based on a specific gesture of a user predetermined to have a right to access the protected module;
        an input module that receives an input gesture from a requester to access the protected module; and
        a gesture engine that is trained to process the input gesture in order to grant/deny an access to the protected module by the requester, computes weights of frequency components respectively for the input gesture and a reference gesture, computes an error based on differences between the weights for the input gesture and the weights for the reference gesture, and compares the error to an error profile associated with the reference gesture, and grants/denies the requester to access the protected module based on the comparison.

2. The system of claim 1, wherein the input module receives a plurality of time-series vectors in response to the input gesture.

3. The system of claim 2, wherein each vector includes values at a sampling time that represent a position in at least one of a two-dimension plane and a three-dimension space.

4. The system of claim 3, wherein the vector further includes at least one of a speed value, an acceleration value and a muscle characteristic value at the sampling time.

5. The system of claim 1, wherein the input module receives multiple times of the specific gesture from the user of the protected module, and the gesture engine calculates the reference gesture and the error profile based on the received multiple times of the specific gesture.

6. The system of claim 1, wherein the gesture engine uses dynamic time warping to align the input gesture with the reference gesture.

7. The system of claim 1, wherein the gesture engine is trained to generate a same key in response to multiple times of gesture inputs from the user.

8. The system of claim 7, wherein the protected module includes encrypted data that is decryptable by the key.

9. The system of claim 8, wherein the key is a symmetric key, and the protected module includes data encrypted of the key.

10. The system of claim 8, wherein the encrypted data is stored with a random number as an index.

11. The system of claim 10, further comprising a hash table configured to store the index of the encrypted data at a location in the hash table, the location being determined by hashing the key.

12. The system of claim 7, wherein the protected module is reachable via a path determined based on the key.

13. The system of claim 12, further comprising a hash table that stores the path to the protected module at a location in the hash table, the location being determined by hashing the key.

14. An apparatus, comprising:
    circuitry implementing
        an input module that receives an input gesture from a requester; and
        a controller that computes weights of frequency components respectively for the input gesture and a reference gesture, computes an error based on differences between the weights for the input gesture and the weights for the reference gesture, and compares the error to an error profile associated with the reference gesture, and grants/denies the requester to use the apparatus based on the comparison.

15. The apparatus of claim 14, wherein the input module receives a plurality of time-series vectors in response to the input gesture.

16. The apparatus of claim 15, wherein each vector includes values at a sampling time that represent a position in at least one of a two-dimension plane and a three-dimension space.

17. The apparatus of claim 16, wherein the vector further includes at least one of a speed value, an acceleration value and a muscle characteristic value at the sampling time.

18. The apparatus of claim 14, wherein the input module receives multiple times of the specific gesture from a user predetermined to have a right to access the apparatus, and the controller calculates the reference gesture and the error profile based on the received multiple times of the specific gesture.

19. The apparatus of claim 14, wherein the controller uses dynamic time warping to align the input gesture with the reference gesture.

20. A method, comprising:
    receiving an input gesture from a requester;
    computing weights of frequency components respectively for the input gesture and a reference gesture;
    computing an error based on differences between the weights for the input gesture and the weights for the reference gesture;
    comparing the error to an error profile associated with the reference gesture; and
    granting/denying the requester to access a system based on the comparison.

21. The method of claim 20, wherein receiving the input gesture from the requester further comprises:
    receiving a plurality of time-series vectors in response to the input gesture.

22. The method of claim 21, wherein each vector includes values at a sampling time that represent a position in at least one of a two-dimension plane and a three-dimension space.

23. The method of claim 22, wherein the vector further includes at least one of a speed value, an acceleration value and a muscle characteristic value at the sampling time.

24. The method of claim 20, further comprising:
    receiving multiple times of a specific gesture from a user having a right to access the system; and
    calculating the reference gesture and the error profile based on the received multiple times of the specific gesture.

25. The method of claim 20, further comprising:
    aligning the input gesture with the reference gesture using dynamic time warping.

* * * * *